US010755418B2

United States Patent
Qiu et al.

(10) Patent No.: US 10,755,418 B2
(45) Date of Patent: Aug. 25, 2020

(54) BACKGROUND BLURRED METHOD AND ELECTRONIC DEVICE BASED ON FOREGROUND IMAGE

(71) Applicant: REALTEK SEMICONDUCTOR CORP., Hsinchu (TW)

(72) Inventors: Zhong-Yi Qiu, Taichung (TW); Wen-Tsung Huang, Chiayi (TW); Kai Liu, Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/371,203

(22) Filed: Apr. 1, 2019

(65) Prior Publication Data

US 2019/0356869 A1    Nov. 21, 2019

(30) Foreign Application Priority Data

May 18, 2018    (TW) .............................. 107117002 A

(51) Int. Cl.
*H04N 5/222*    (2006.01)
*H04N 5/235*    (2006.01)
(Continued)

(52) U.S. Cl.
CPC .............. *G06T 7/194* (2017.01); *G06T 5/002* (2013.01); *G06T 5/009* (2013.01); *G06T 5/50* (2013.01);
(Continued)

(58) Field of Classification Search
CPC ........ H04N 5/33; H04N 5/235; H04N 5/2351; H04N 5/2354; H04N 5/272; H04N 5/2226;
(Continued)

(56) References Cited

U.S. PATENT DOCUMENTS 8,983,151 B2    3/2015   Park et al.
9,008,457 B2    4/2015   Dikmen et al.
(Continued)

FOREIGN PATENT DOCUMENTS

| CN | 102760234 A | 10/2012 |
| CN | 107408205 A | 11/2017 |
| TW | 201711449 A | 3/2017 |

OTHER PUBLICATIONS

James W. Davis, et al., "Background-subtraction using contour-based fusion of thermal and visible imagery", Computer Vision and Image Understanding, www.sciencedirect.com, Jan. 25, 2007, p. 162-182, Issue 106 (2007), Computer Vision and Image Understanding, Columbus USA.

Han Ju, et a., "Fusion of color and infrared video for moving human detection", Pattern Recognition, ScienceDirect, www.sciencedirect.com, pp. 1771-1784.

*Primary Examiner* — Marly S Camargo
(74) *Attorney, Agent, or Firm* — Li & Cai Intellectual Property (USA) Office

(57) ABSTRACT

A background blurred method includes steps as follows: obtaining a color image, an IR light frame image and an IR dark frame image, and calculating a differential image between the IR light frame image and the IR dark frame image to generate a binary image; obtaining a foreground image of the binary image; calculating an IR brightness mean value of the foreground image of the differential image; and filtering the color image to generate a background blurred image according to the IR brightness mean value.

18 Claims, 13 Drawing Sheets

(51) Int. Cl.
| | |
|---|---|
| *H04N 5/33* | (2006.01) |
| *H04N 5/272* | (2006.01) |
| *H04N 5/351* | (2011.01) |
| *H04N 9/04* | (2006.01) |
| *G06K 9/38* | (2006.01) |
| *G06K 9/00* | (2006.01) |
| *G06T 5/00* | (2006.01) |
| *G06T 5/50* | (2006.01) |
| *G06T 7/174* | (2017.01) |
| *G06T 7/194* | (2017.01) |
| *G06T 7/11* | (2017.01) |

(52) U.S. Cl.
CPC .............. *G06T 7/11* (2017.01); *G06T 7/174* (2017.01); *H04N 5/2226* (2013.01); *H04N 5/2351* (2013.01); *H04N 5/33* (2013.01); *G06T 2207/10048* (2013.01); *G06T 2207/20224* (2013.01)

(58) Field of Classification Search
CPC ........ H04N 5/332; H04N 5/226; H04N 5/351; H04N 9/04553; H04N 21/4318; H04N 1/32261; H04N 1/32251; H04N 1/40087; G06K 9/38; G06K 9/0025; G06T 5/00; G06T 5/002; G06T 5/003; G06T 5/50; G06T 5/009; G06T 7/194; G06T 7/11; G06T 7/174; G06T 2207/10048; G06T 2207/20224

USPC ... 348/222.1, 164, 33, 223.1, 234, 271, 272, 348/273, 277, 586, 687, 224.1, 342, 254, 348/671; 382/274, 255, 254, 264, 263, 382/266, 172, 169, 237

See application file for complete search history.

(56) References Cited

U.S. PATENT DOCUMENTS

| | | | |
|---|---|---|---|
| 9,578,259 B2* | 2/2017 | Molina | H04N 5/272 348/208.6 |
| 9,955,140 B2* | 4/2018 | Rhemann | H04N 5/33 348/164 |
| 10,477,121 B2* | 11/2019 | Machida | H04N 5/378 348/294 |
| 2011/0116078 A1* | 5/2011 | Cho | H01L 27/14627 250/338.1 |
| 2012/0087645 A1* | 4/2012 | Wu | G03B 17/00 396/439 |
| 2012/0262553 A1 | 10/2012 | Chen et al. | |
| 2016/0269714 A1 | 9/2016 | Rhemann et al. | |
| 2017/0064219 A1 | 3/2017 | Lin et al. | |
| 2019/0007629 A1* | 1/2019 | Lin | H04N 5/2351 348/164 |

* cited by examiner

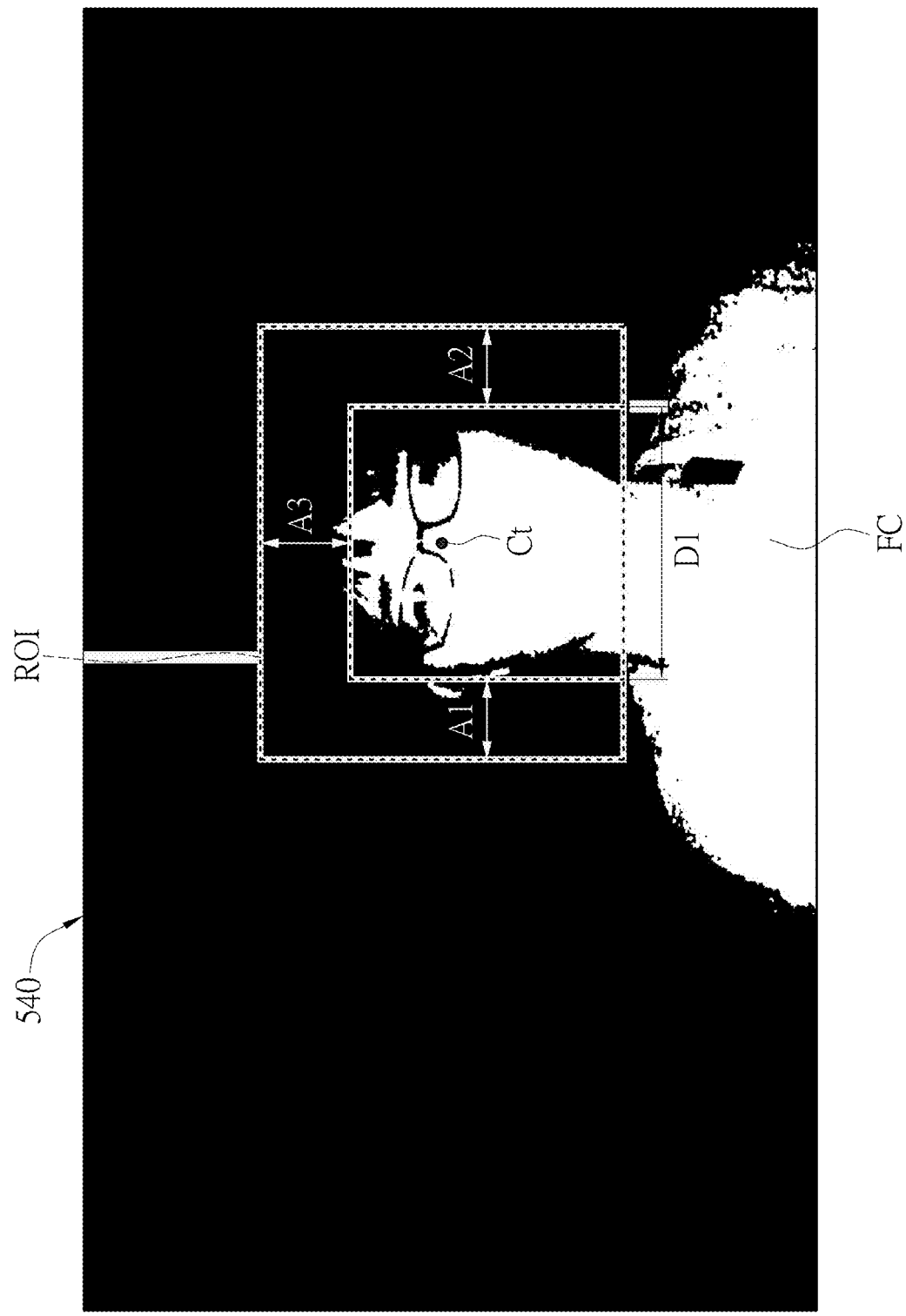

BACKGROUND BLURRED METHOD AND ELECTRONIC DEVICE BASED ON FOREGROUND IMAGE

CROSS-REFERENCE TO RELATED PATENT APPLICATION

This application claims the benefit of priority to Taiwan Patent Application No. 107117002, filed on May 18, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a background blurred method and an electronic device and more particularly to a background blurred method based on foreground image and an electronic device.

BACKGROUND OF THE DISCLOSURE

A background blurred method has been widely applied in photography and video calls in recent years. Common background blurred techniques are described as follows. A shallow depth of field (DoF) photo shooting technique is typically adopted to emphasize the figure of a subject in an image when the photo is shot by an electronic device. In other words, the shallow DoF photo shooting technique is to focus a focal length of lenses on a specific range of distance in the image such that the figure of the subject within the range of distance can be sharpened and the background outside the range can be blurred.

Another way to generate blurred or sharp images is by modifying or adjusting photo shooting parameters of the camera. For example, a series of photos of a scene are shot using different focal lengths, and then the clearest position of each of the pixels in each of the images is respectively found. Afterwards, a relative DoF of each of the pixels in the image can be estimated according to a relationship between the focal length and the DoF. However, the technique requires an appropriate control of the photo shooting parameters by the user to estimate the relative DoF so as to obtain the image with a sharpened figure and a blurred background. For most users, modifying or adjusting photo shooting parameters is difficult.

Therefore, the electronic device capable of automatically blurring the background in the image can help the user to easily obtain the image with a sharpened figure and a blurred background.

SUMMARY OF THE DISCLOSURE

In response to the above-referenced technical inadequacies, the present disclosure provides a background blurred method based on a foreground image, adapted for an electronic device. The background blurred method includes the steps of: acquiring a color image, an infrared (IR) light frame image indicating a light state and an IR dark frame image indicating a dark state, calculating a differential image between the IR light frame image and the IR dark frame image, thresholding the differential image to generate a binary image; acquiring a foreground image of the binary image, and the binary image has a pixel position corresponding to that of the color image, and the pixel position of the foreground image corresponds to a pixel position of an object in the binary image and corresponds to a pixel position of the object in the color image; acquiring an IR brightness mean value of a foreground part of the differential image, wherein the foreground part corresponds to the foreground image; and filtering the color image to generate a background blurred image according to the IR brightness mean value, and a blurred degree of at least a part of the background blurred image is positively correlated with the IR brightness mean value.

In certain embodiments, the present disclosure provides the background blurred method based on the foreground image, and the step of acquiring the IR brightness mean value of the foreground part of the differential image further including: acquiring, in the differential image, a pixel value of each of the pixel locations corresponding to the foreground image; and averaging the pixel values to obtain the IR brightness mean value.

In one aspect, the present disclosure provides an electronic device, including an IR emitter, an image capturing device and an image processor. The IR emitter is configured to transmit an IR signal. The image capturing device is configured to receive an IR reflection signal related to the IR signal, and configured to receive a visible light signal. The image processor is coupled to the IR emitter and the image capturing device and configured to execute steps of: acquiring a color image, an infrared (IR) light frame image indicating a light state and an IR dark frame image indicating a dark state; calculating a differential image between the IR light frame image and the IR dark frame image, and thresholding the differential image to generate a binary image; acquiring a foreground image of the binary image, wherein the binary image has a pixel position corresponding to that of the color image, wherein the pixel position of the foreground image corresponds to a pixel position of an object in the binary image and corresponds to a pixel position of the object in the color image; acquiring an IR brightness mean value of a foreground part of the differential image, wherein the foreground part corresponds to the foreground image; and filtering the color image to generate a background blurred image according to the IR brightness mean value, wherein a blurred degree of at least a part of the background blurred image is positively correlated with the IR brightness mean value.

In certain embodiments, the present disclosure provides the electronic device, and in the step of acquiring the IR brightness mean value of the foreground part of the differential image by the image processor, the image processor is further configured to: obtain, in the differential image, a pixel value of each of the pixel locations corresponding to the foreground image; and average the pixel values to obtain the IR brightness mean value.

Therefore, according to a distance between the foreground image (including the user's face, body, and hair) and the electronic device, a blurred degree can be calculated, and then a background image of the color image can be blurred according to the blurred degree. As a result, the color image can closely resemble what is seen by human eyes.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which:

FIG. 6D is a view of a region of interest in one embodiment of the present disclosure.

DETAILED DESCRIPTION OF THE EXEMPLARY EMBODIMENTS

Figure 1:
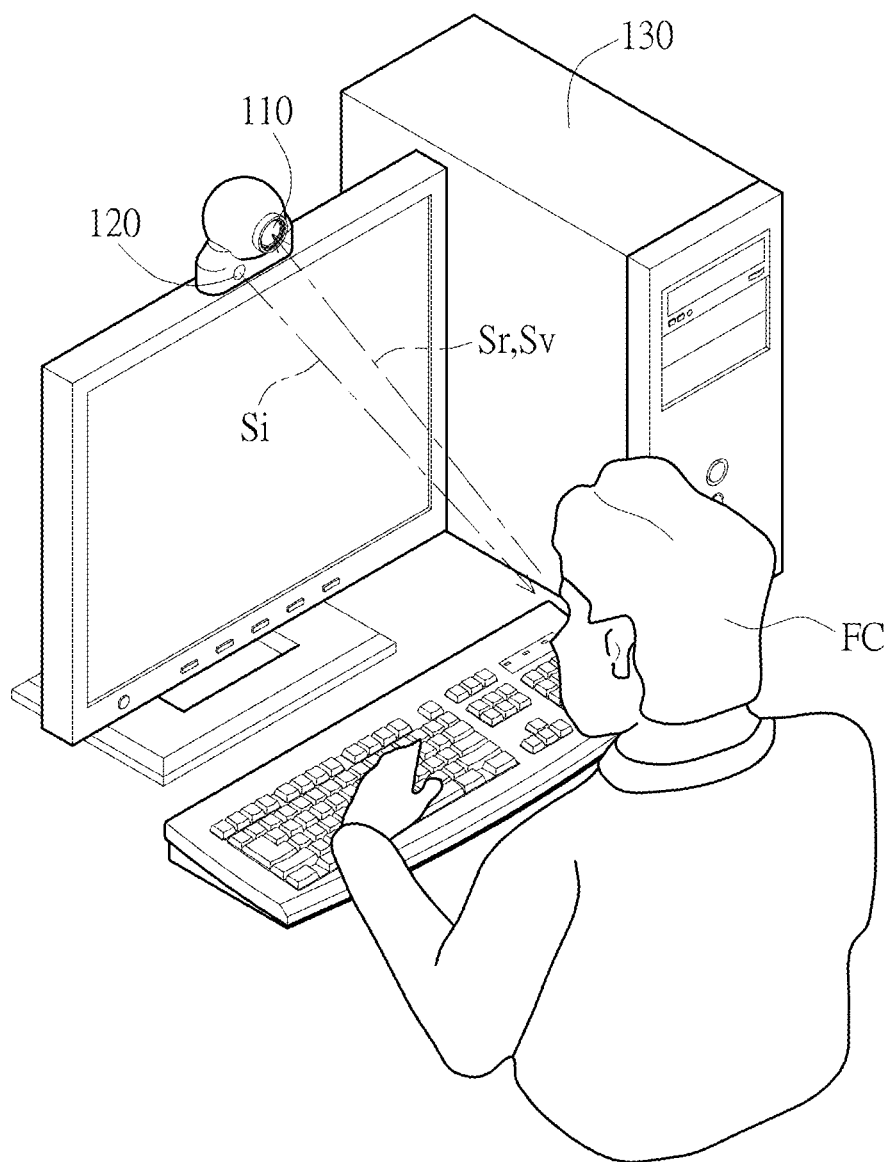
FIG. 1 is a position related view of a user and an electronic apparatus in one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present application provides a background blurred method based on a foreground image and an electronic device. The background blurred method applies background blur on a color image according to the foreground image so as to generate the background blurred image. The foreground image is an image of an object. The object can be of any kind such as a human being, an animal, or an item, etc. In this embodiment, the foreground image is a user (including the user's face, body, and hair). Further, a blurred degree can be calculated by the electronic device according to a distance between the foreground image and the electronic device, and then a background image of the color image can be blurred according to the blurred degree. As a result, the color image can be much like what is seen by human eyes.

The electronic device obtains the aforementioned foreground image by controlling an infrared (IR) emitter from a dark state to a light state and then from the light state to the dark state. Specifically, the electronic device captures an IR light frame image indicating a light state, an IR dark frame image indicating a dark state, and a color image. Then, the electronic device executes certain simple calculations to generate a sharper foreground image (including the user's face, body, and hair) according to the IR light frame image, the IR dark frame image and the color image.

The background blurred method based on the foreground image and the electronic device according to the present application will be further described as follows.

Figure 2:
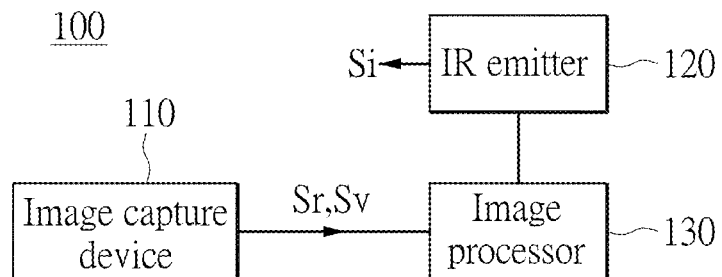
FIG. 2 is a view of the electronic apparatus in one embodiment of the present disclosure.

Firstly, with reference to FIGS. 1 and 2, FIG. 1 is a position related view of a user and an electronic apparatus in one embodiment of the present disclosure and FIG. 2 is a view of the electronic apparatus in one embodiment of the present disclosure. As shown in FIGS. 1 and 2, the electronic apparatus 100 is disposed at a location close to a user FC, and is configured to shoot a motion image of the user FC. The electronic apparatus 100 includes an image capture device 110, an IR emitter 120 and an image processor 130. The image processor 130 is coupled to the image capture device 110 and the IR emitter 120. In the present embodiment, the electronic apparatus 100 could be a smart phone, a monitor, a tablet, a laptop or any other electronic apparatus capable of acquiring IR images and RGB images at the same time, and the present disclosure is not limited thereto.

As shown in FIG. 1, the IR emitter 120 transmits an IR signal Si to the user FC, and the user FC will reflect an IR reflecting signal Sr. At the same time, the image capture device 110 will receive a visible light signal Sv generated by the IR reflecting signal Sr reflected from the user and an ambient light. Furthermore, the IR emitter 120 can be formed of one or more IR light emitter diodes (LEDS) and disposed at a location close to the image capture device 110. In the present disclosure, the IR emitter 120 is formed of an IR LED, and is disposed below the image capture device 110. The image capture device 110 is an RGB-IR sensor to make the image capture device 110 capable of receiving the IR reflecting signal Sr and the visible light signal Sv at the same time. Naturally, the image capture device 110 can also be formed of two standalone sensors (one RGB sensor and one IR sensor), and the present disclosure is not limited thereto.

The image processor 130 controls the IR emitter 120 from a dark state to a light state and from the light state to the dark state. During the aforementioned process, the image processor 130 will receive the IR reflecting signal Sr and the visible light signal Sv, and generate a motion image according to the IR reflecting signal Sr and the visible light signal Sv. The foreground image of the user FC in the motion image is extracted by performing the following steps.

Figure 3:
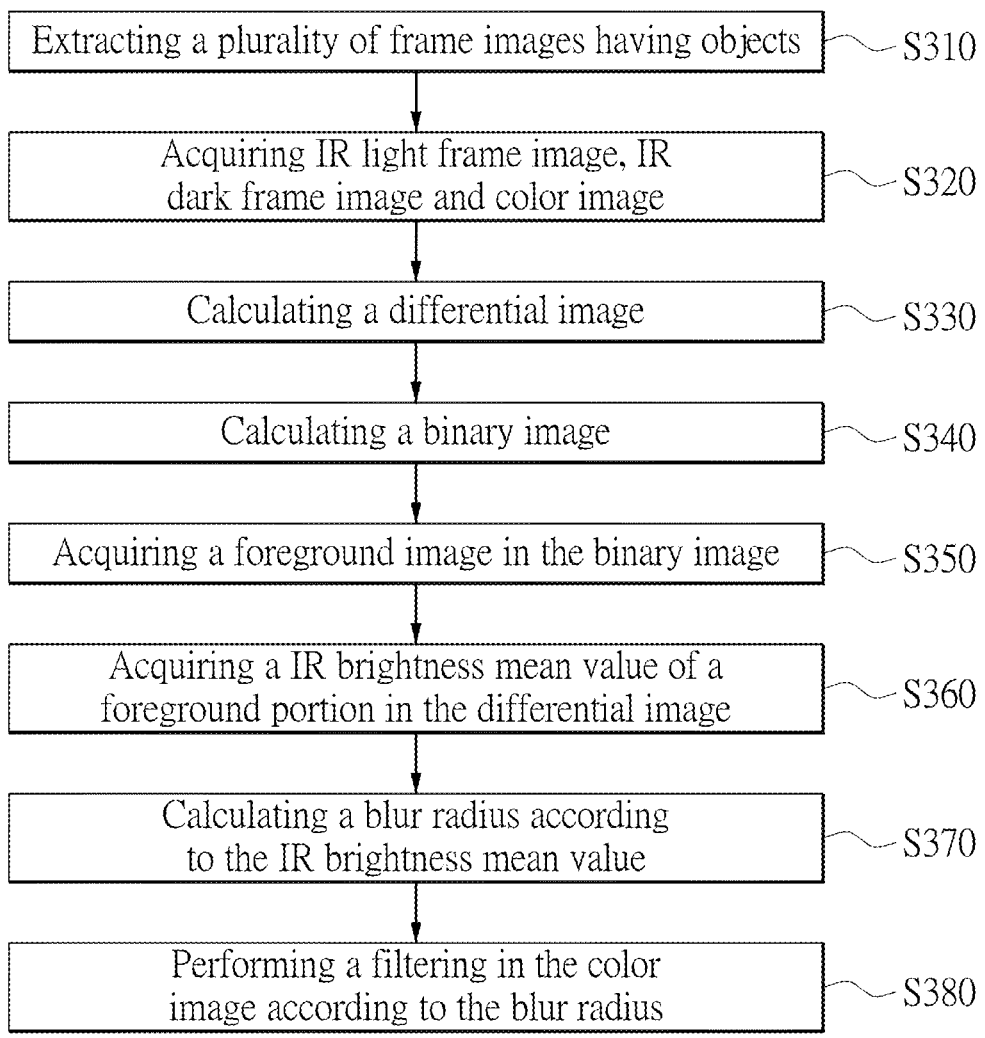
FIG. 3 is a flowchart illustrating a background virtualizing method based on a foreground image in one embodiment of the present disclosure.
Figure 4D:
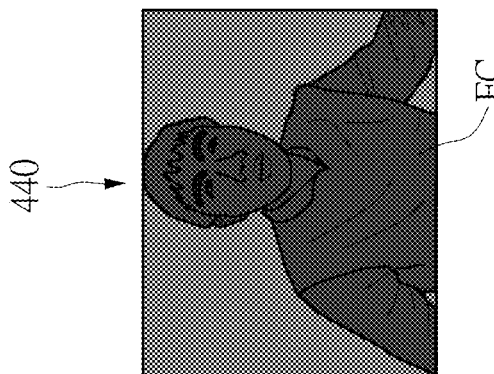
FIGS. 4A-4D are views illustrating an image processor extracting four frame images in one embodiment of the present disclosure.
Figure 4C:
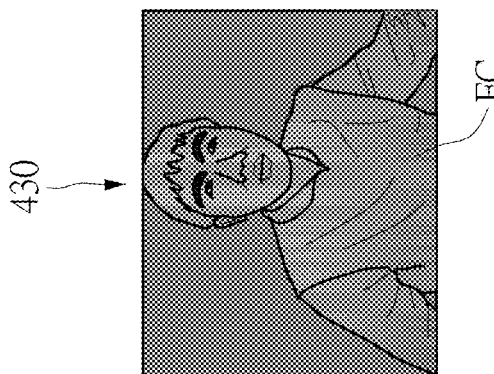
Figure 4B:
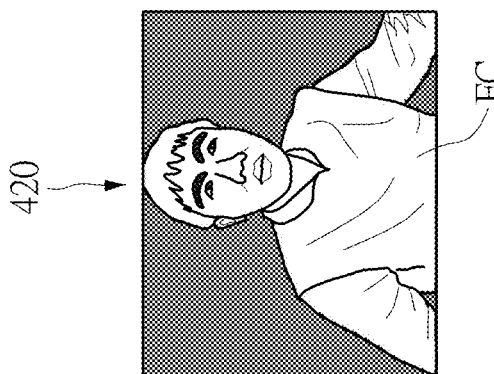
Figure 4A:
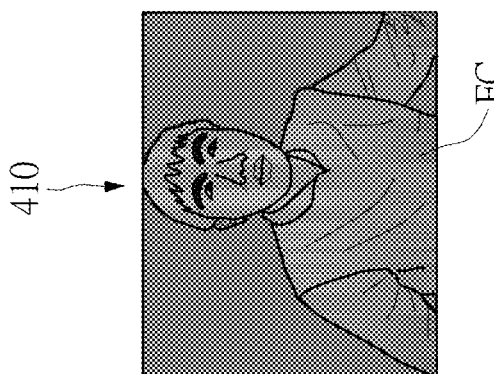

Reference is made to FIG. 3, which is a flowchart illustrating a background virtualizing method from the foreground image in one embodiment of the present disclosure. Firstly, the image processor 130 of the electronic apparatus 100 extracts a plurality of frame images of the user FC from the motion image (step S310), and then acquires an IR light frame image indicating the light state, an IR dark frame image indicating the dark state, and a color image (step S320).

Furthermore, with reference to FIGS. 4A-4D, the image processor 130 sequentially acquires four frame images of the user FC. The four frame images includes a first frame image 410 indicating the conversion from the dark state to the light state, a second frame image 420 in the light state, a third frame image 430 indicating the conversion from the light state to the dark state, and a fourth frame image 440 in the dark state. In the four frame images, the first frame image 410 and the third frame image 430 are images when not all of the IR light sources are turned on or turned off, and the second frame image 420 and the fourth frame image 440 are images when all of the IR light sources are turned on or turned off. Therefore, the image capture device 110 will acquire the IR image in the second frame image 420 to be the IR light frame image (as the IR light frame image 510 in FIG. 5), the IR image in the fourth frame image 440 to be the IR dark frame image (as the IR dark frame image 520 in FIG. 5), and the RGB image in the third frame image 430 to be the color image.

It should be noted that the RGB image in the third frame image 430 can easily be affected by the IR rays when acquiring the third frame image 430 and the IR light sources are not all turned off. Therefore, the aforementioned RGB images will include a compensation technique (e.g., crosstalk compensation) to reduce the effect of the IR rays. The aforementioned compensation technique is well known to one with ordinary skill in the art, and will not be reiterated herein.

In other embodiments, the image processor 130 is able to sequentially acquire six frame images (not shown in figure) of the user FC. The six frame images respectively include a first frame image indicating the conversion from the dark state to the light state, a second frame image in the light state, a third frame image indicating the conversion from the light state to the dark state, a fourth frame image in the dark state, a fifth frame image and a sixth frame image. In the six frame images, the first frame image and the third frame image are images when the IR light sources are not all turned on or turned off, and the second frame image, the fourth frame image, the fifth frame image and the sixth frame image are images when the IR light sources are all turned on or turned off. Therefore, the image processor 130 will acquire the IR image in the second frame image to be the IR light frame image, the IR image in the fifth frame image to be the IR dark frame image, and the RGB image in the fourth frame image or the sixth frame image to be the color image.

It should be noted that the fourth frame image or the sixth frame image are images when the IR light sources are all turned off, so that the fourth frame image will not be affected by the effect of the IR rays and does not require any other compensation techniques. The image processor 130 may implement other manners to acquire the IR light frame image, the IR dark frame image and the color image, and the present disclosure is not limited thereto.

Figure 5:
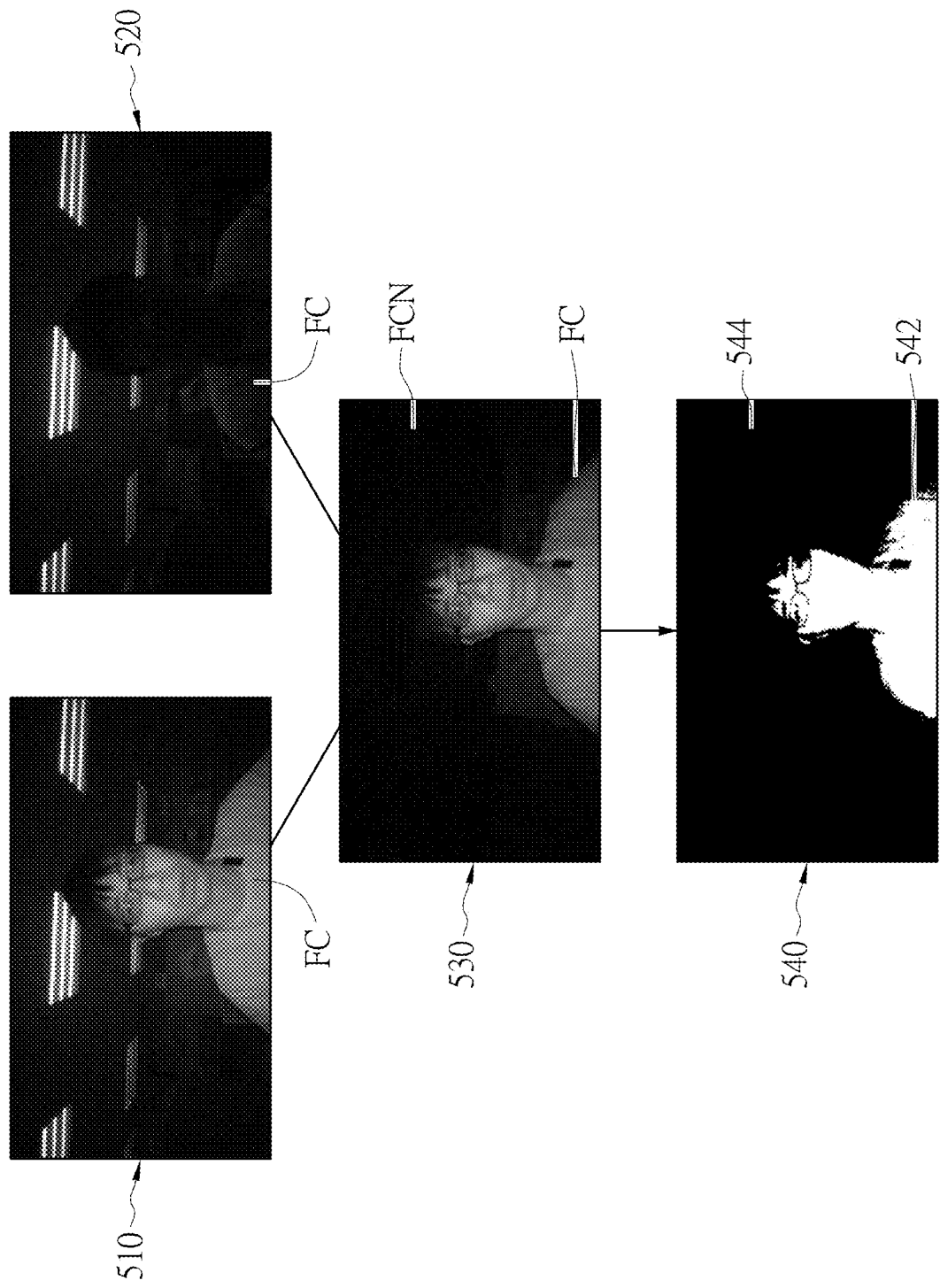
FIG. 5 is a schematic view of calculating a binary image in one embodiment of the present disclosure.

Then, with reference to FIG. 5, after acquiring the IR light frame image, the IR dark frame image and the color image (step S320), the image processor 130 calculates a differential image 530 between the IR light frame image 510 and the IR dark frame image 520 (step S330), and thresholds the differential image 530 to generate a binary image 540 (step S340) so as to separate the image with the user FC (the foreground portion) from the rest of the image without the user FCN (the background portion) in the differential image 530. At the same time, the binary image 540 includes a plurality of foreground pixels 542 and a plurality of background pixels 544.

More specifically, the image processor 130 will sequentially acquire pixel values at a certain pixel position in the IR light frame image 510 and the IR dark frame image 520. Then, the image processor 130 sequentially calculates the differences between the pixel values at the certain pixel position to generate the differential image 530. The pixel value of the differential image 530 at each of the pixel positions can be represented by the following equation (1):

$$IRdif(x,y) = (IRb(x,y) - IRd(x,y))/2 \tag{1}$$

where (x, y) is a pixel position, IRb(x, y) is a pixel value at a certain pixel position of the IR light frame image, IRd(x, y) is a pixel value at a certain pixel position of the IR dark frame image, and IRdif(x, y) is the pixel value at a certain pixel position of the differential image. It should be noted that the definition of the pixel value of the differential image may be different, and the equation (1) is just one of the definitions in the present embodiment.

Compared with the background portion, the foreground portion is closer to the IR emitter 120. Therefore, when comparing the strengths of the IR reflecting signals Sr reflected from the foreground portion at the light state and at the dark state, the difference in the strengths therebetween would be larger. Conversely, when comparing the strengths of the IR reflecting signal Sr reflected from the background portion at the light state and at the dark state, the difference in the strength therebetween would be smaller.

For example, in the IR light frame image 510 and the IR dark frame image 520 acquired by the image processor 130, the pixel values at a certain pixel position (x, y)=(10, 50) are 50 and 20 respectively. The image processor 130 calculates the pixel value IRdif(10, 50) of the differential image 530 at the pixel position (10, 50) by the equation (1), and IRdif(10, 50)=(IRb(10, 50)−IRd(10, 50))/2=(50−20)/2=15. In a different example, in the IR light frame image 510 and the IR dark frame image 520, the pixel values at a certain pixel position (x, y)=(100, 100) are 150 and 30 respectively. The image processor 130 calculates the pixel value IRdif(100, 100) of the differential image 530 at the pixel position (100, 100) with equation (1), i.e., IRdif(100, 100)=(IRb(100, 100)−IRd(100, 100))/2=(150−30)/2=60. Other pixel values of the differential image 530 at other pixel positions are also calculated by the equation (1).

Figure 6A:
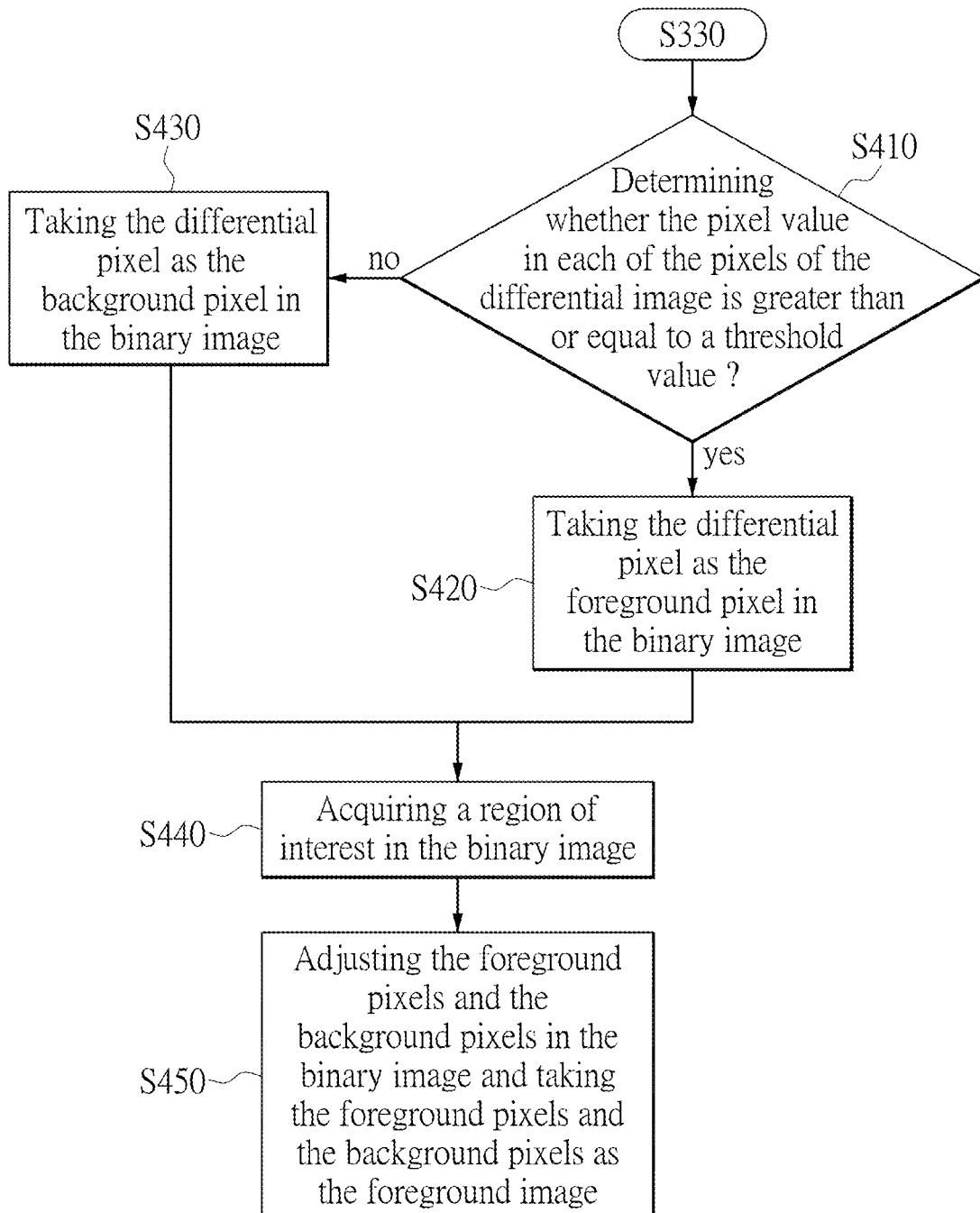
FIG. 6A is a flowchart of acquiring the binary image in one embodiment of the present disclosure.

With reference to FIG. 6A, during the process when the image processor 130 binarizes the differential image 530 to generate the binary image 540 (step S340), the image processor 130 determines whether the pixel values at each of the pixels (also called the differential pixels) in the different image 530 are greater than or equal to a threshold value (step S410). If the pixel value of the differential pixel is greater than or equal to the threshold value, the differential pixel is determined to be the foreground pixel 542 of the binary image 540 by the image processor 130 (step S420). Conversely, if the pixel value of the differential pixel is less than the threshold value, the differential pixel is determined to be the background pixel 544 of the binary image 540 by the image processor 130 (step S430).

In continuation of the aforementioned embodiment, the threshold value is set to be 25. Therefore, the image processor 130 determines the pixel value of the differential pixel as IR(10, 50)=15, which is less than the threshold value 25, so that the differential pixel (10, 50) is determined to be the background pixel 544 of the binary image 540. The image processor 130 determines the pixel value of the differential pixel as IR(100, 100)=60, which is greater than the threshold value 25, so that the differential pixel (100, 100) is determined to be the foreground pixel 542 of the binary image 540. In this embodiment, the pixel value of the foreground pixel 542 is 255 (indicating white color), and the pixel value of the background pixel 544 is 0 (indicating black color). However, the pixel values of the foreground pixel 542 and the pixel values of the background pixel 544 can be set according to practical requirements, and the present disclosure is not limited thereto.

The calculation of the differential image 530 and the binary image 540 and the development of the threshold value in the aforementioned description can be modified according to practical requirements, and the present disclosure is not limited thereto.

It should be noted that if the color in the hair portion (belonging to the foreground pixel 542) of the user FC is darker and the reflection of the IR rays is poor, the hair portion in the differential image 530 will be determined to be the background image through the aforementioned thresholding embodiment, as illustrated by the background pixel 544 at the binary image 540 shown in FIG. 5. The image processor 130 will change the hair portion of the user FC to be the foreground image 544 when necessary. Accordingly, the image processor 130 will perform step S440 and step S450 to acquire the foreground pixels in the human face portion and the hair portion of the user FC.

In step S440, the image processor 130 will acquire a region of interest ROI in the binary image 540 according to a frame position of a facial representation frame RFr. The region of interest ROI corresponds to the human face portion and the hair portion of the user FC.

Figure 6B:
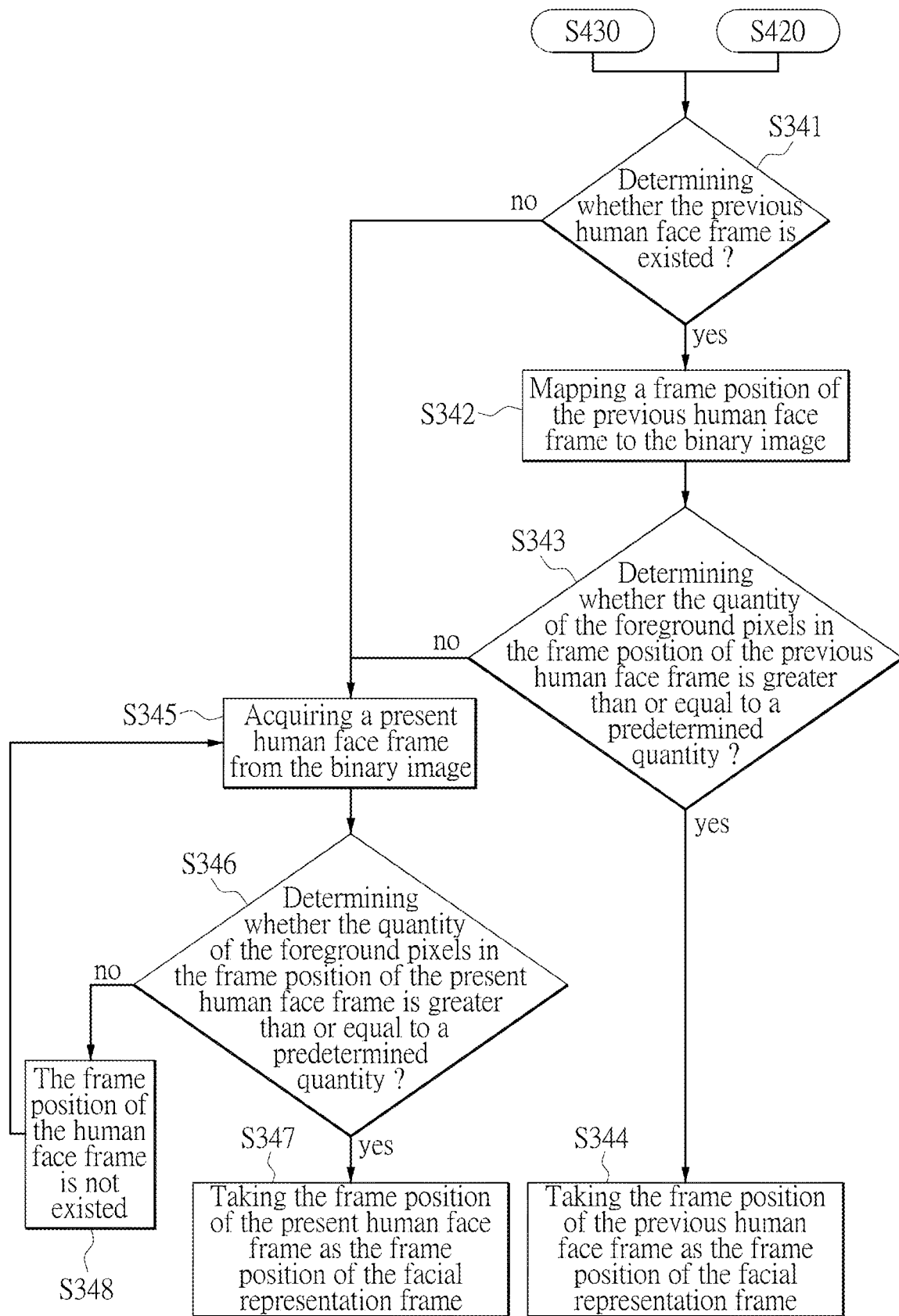
FIG. 6B is a flowchart of acquiring a facial representation frame in one embodiment of the present disclosure.

Furthermore, the image processor 130 will acquire the frame position of the facial representation frame RFr through the steps in the flowchart of FIG. 6B. Firstly, the image processor 130 determines whether a previous human face frame is existed (step S341). In the present embodiment, the previous human face frame is the facial representation frame acquired by the image processor 130 at the previous time of acquisition or acquired several times before, and the present disclosure is not limited thereto.

When the image processor 130 determines that the previous human face frame exists, it represents that the image processor 130 may implement the previous human face frame to perform the following process so as to minimize the calculation for re-searching the facial representation frame. At the same time, the image processor 130 maps a frame position for the previous human face frame to the binary image 540 (step S342).

Figure 6C:
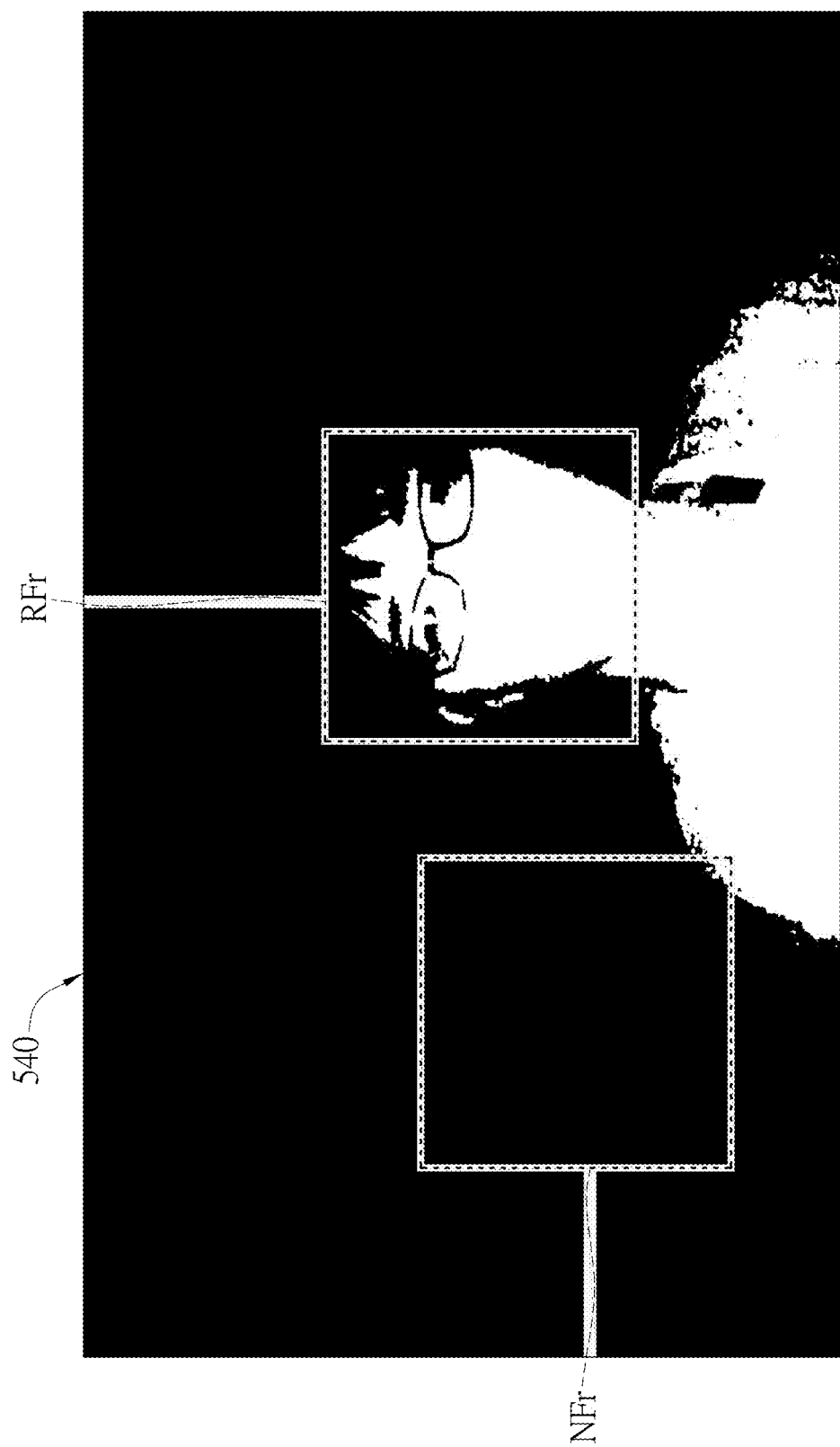
FIG. 6C is a view of the facial representation frame in one embodiment of the present disclosure.

Then, the image processor 130 will further determine whether a quantity of the foreground pixels in the frame position of the previous human face frame is greater than or equal to a predetermined quantity (step S343). If the image processor 130 determines that the aforementioned quantity is greater than or equal to the predetermined quantity (e.g., 50*50), the previous human frame can be used to perform the following process. At the same time, the image processor 130 implements the frame position of the previous human face frame to be the frame position of the human face frame RFr (step S344), as shown in FIG. 6C. On the contrary, if the image processor 130 determines that the aforementioned quantity is less than the predetermined quantity, it represents that the movement of the user FC is excessively large, and the previous human face cannot be used to perform the following process. At the same time, the image processor 130 acquires a present human face frame from the binary image 540 (step S345) and determines whether the quantity of the foreground pixels in the frame position of the present human face frame is greater than or equal to the predetermined quantity (e.g., 40*40) (step S346).

If the image processor 130 determines that the aforementioned quantity is greater than or equal to the predetermined quantity, it represents that the present human face frame found in the binary image 540 by the image processor 130 is correct (the face portion of the user FC is found). At the same time, the image processor 130 implements the frame position of the present human face frame to be the frame position of the human face frame RFr (step S347), as shown in FIG. 6C. Conversely, if the image processor 130 determines that the aforementioned quantity is less than the predetermined quantity, it represents that the wrong present human face frame NFr in the binary image 540 by the image processor 130 is found. At the same time, the image processor 130 determines that the frame position of the human face frame is not acquired (step S348), and the process returns to the step S345 to re-calculate the present human face frame in the binary image 540 to perform the determination in step S346. In the present embodiment, the image processor 130 may implement any human face detection algorithm to acquire the present human face frame in the binary image 540, and the present disclosure is not limited thereto.

Referring back to the step S341 in FIG. 6B, the image processor 130 determines whether the previous human face frame exists. If the image processor 130 determines that the previous human face frame does not exist, it represents that the image processor 130 performs the step of acquiring the facial representation frame for the first time or that the previous facial representation frame cannot be used. At the same time, the image processor 130 will perform the steps S345-S346 to implement the frame position of the present human face frame to be the frame position of the facial representation frame RFr. Since the steps S345-S346 have been described above, descriptions thereof will not be reiterated herein.

Referring back to FIG. 6A, after the image processor 130 acquires the frame position of the facial representation frame RFr, as shown in FIG. 6C, (e.g., steps S344 and S347), the region of interest ROI in the binary image 540 is acquired according to the frame position of the facial representation frame RFr. Furthermore, as shown in FIG. 6D, since the hair portion of the user FC is located at the left side, the right side and the topside of the human face portion, the image processor 130 will extend the facial representation frame RFr to the left by a first predetermined distance A1, to the right by a second predetermined distance A2, and upwards by a third predetermined distance A3, so as to generate the region of interest ROI. In this embodiment, the facial representation frame RFr includes a frame length D1. The image processor 130 will extend the facial representation frame RFr to the left by 30% of the frame length D1 (e.g., the first predetermined distance A1), to the right by 30% of the frame length D1 (e.g., the second predetermined distance A2), and upwards by 50% of the frame length D1 (e.g., the third predetermined distance A3) so as to generate the region of interest ROI. Therefore, the region of interest ROI will be also mapped to the human face portion and the hair portion of the user FC.

In order to change the hair portion of the user FC to be the foreground pixels, after acquiring the region of interest ROI (step S440), the image processor 130 adjusts the foreground pixels and the backgrounds pixels in the region of interest ROI according to the differential image 530, the color image and the distance relationship between each of the pixel positions in the region of interest ROI of the binary image and a central point Ct, and implements the foreground pixels to be the foreground image. It should be noted that a pixel position corresponding relationship exists among the differential image 530, the color image and the binary image 540. For example, the pixel position (10, 10) in the differential image 530 corresponds to the pixel position (10, 10) in the color image and the pixel position (10, 10) in the binary image, and the rest of the pixel positions at the aforementioned images are located according to the corresponding relationship.

Figure 7A:
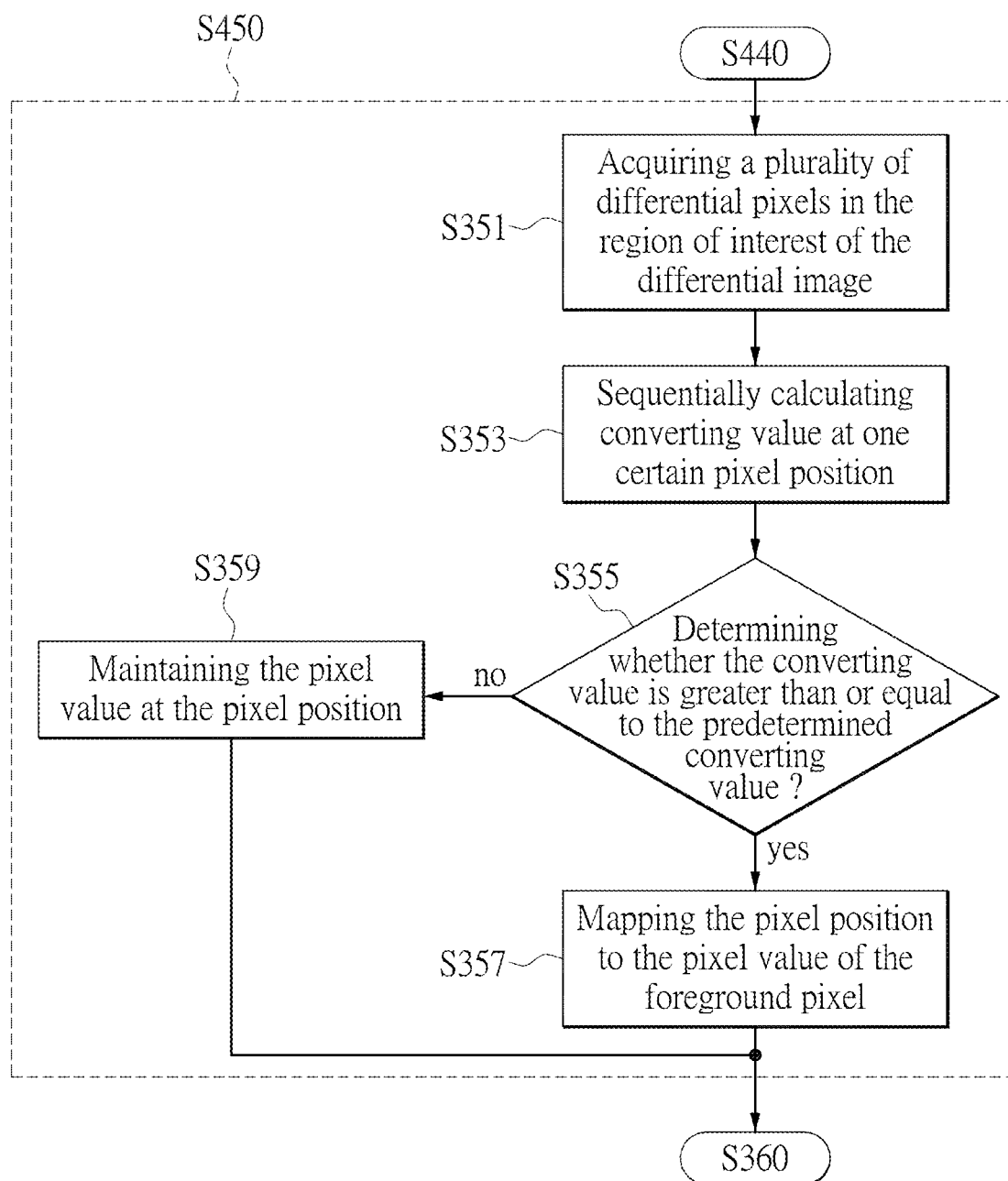
FIG. 7A is a flowchart of adjusting foreground pixels and background pixels at the region of interest in one embodiment of the present disclosure.

Furthermore, FIGS. 6D, 7A, 7B and 7C are referred to at the same time. FIG. 7A is a flowchart of adjusting the foreground pixels and the background pixels at the region of interest ROI in one embodiment of the present disclosure. The image processor 130 will firstly implement the pixel positions in the region of interest ROI of the binary image 540 corresponding to the differential image 530 to acquire a plurality of differential pixels in the region of interest ROI of the differential image (step S351). Next, the image processor 130 sequentially calculates a converting value at one of the differential pixels according to the distance relationship among the pixel value of the differential pixel of the differential image 530, the brightness mean value of the color image, and a distance relationship between the pixel position and the central point Ct of the region of interest ROI (step S353).

Then, the image processor 130 will determine whether the converting value is greater than a predetermined converting value (step S355). If the converting value is greater than the predetermined converting value, it represents that the image processor 130 determines that the pixel position is the hair portion of the user FC. At the same time, the image processor 130 will implement the pixel position corresponding to the pixel value of the foreground pixel (step S357). Conversely, if the converting value is less than the predetermined converting value, it represents that the image processor 130 determines that the pixel position is not the hair portion of the user FC. At the same time, the image processor 130 maintains the pixel value at the pixel position (step S359).

According to the characteristics of the foreground pixel 542 (corresponding to the user FC) at the differential image 530, the color image and the region of interest ROI, when the pixel value of the differential pixel of the differential image 530 is lower, it represents that the pixel is more likely to be the foreground pixel; when the brightness mean value of the color image is lower, it represents that the pixel is more likely to be the foreground pixel; and when a certain pixel position at the region of interest ROI is closer to the central point Ct, it represents that the pixel is more likely to be the foreground pixel.

Therefore, the image processor 130 may arrange the steps S351-S359 into the following equations (2)-(6) to adjust the foreground pixels and the background pixels in the region of interest ROI so as to generate the adjusted binary image 640. It should be noted that, in order to differentiate between the binary image 540 before adjustment and the binary image 640 after adjustment, the adjusted binary image 640 is also called a binary strength image 640 in the embodiment of the present disclosure.

$$FG(x, y) = \begin{cases} F\max, \forall (x, y) \in ROI \text{ and } \frac{256 \times 256 \times \sqrt{POW}}{LUM \times RAD \times UV} = TRS \geq ROI\_TH \\ Fbi(x, y), \text{ otherwise} \end{cases} \quad (2)$$

$$POW = 256 - IRdif(x, y) \quad (3)$$

$$LUM = 256 * Y(x, y)/Y\max \quad (4)$$

$$RAD = R\_cur(x, y)/R\_roi \quad (5)$$

$$UV = |U(x, y) - 128| + |V(x, y) - 128| + 1 \quad (6)$$

where $FG(x, y)$ is the pixel value at a certain pixel position of the binary image 640, $(x, y)$ is the certain pixel position, F max is the pixel value, which is 255 in the present embodiment (indicating the white color), of the foreground pixel in the binary image 640, $Fbi(x, y)$ is the pixel value at the pixel position$(x, y)$ of the binary image 540 (before adjustment), $IRdif(x, y)$ is the pixel value at a certain pixel position of the differential image 530, $Y(x, y)$ is the brightness mean value at the certain pixel position of the color image, Y max is the maximum brightness mean value of the color image, $R\_cur(x, y)$ is the distance between the central point Ct and the certain pixel position of the region of interest ROI, R_roi is the farthest distance between the central point Ct and the pixel position of the region of interest ROI, $U(x, y)$ and $V(x, y)$ are color information at the certain pixel position of the color image, TRS is the converting value, and ROI_TH is the predetermined converting value. It should be noted that the definition of the pixel value of the binary image 640 may be different, and the equations (2)-(6) are just one of the definitions in the present embodiment.

Figure 7B:
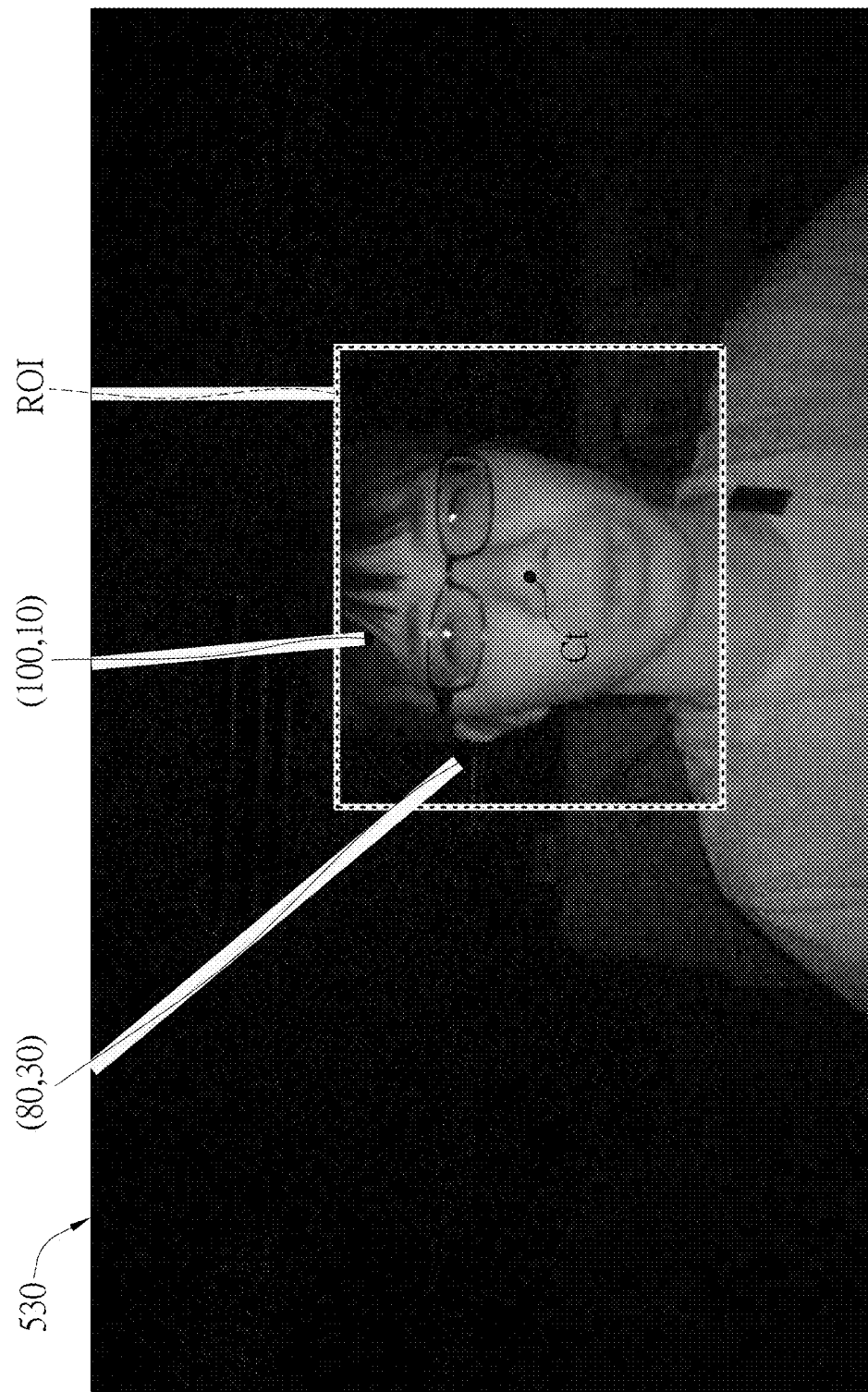
FIG. 7B is a schematic view of a differential image in one embodiment of the present disclosure.
Figure 7C:
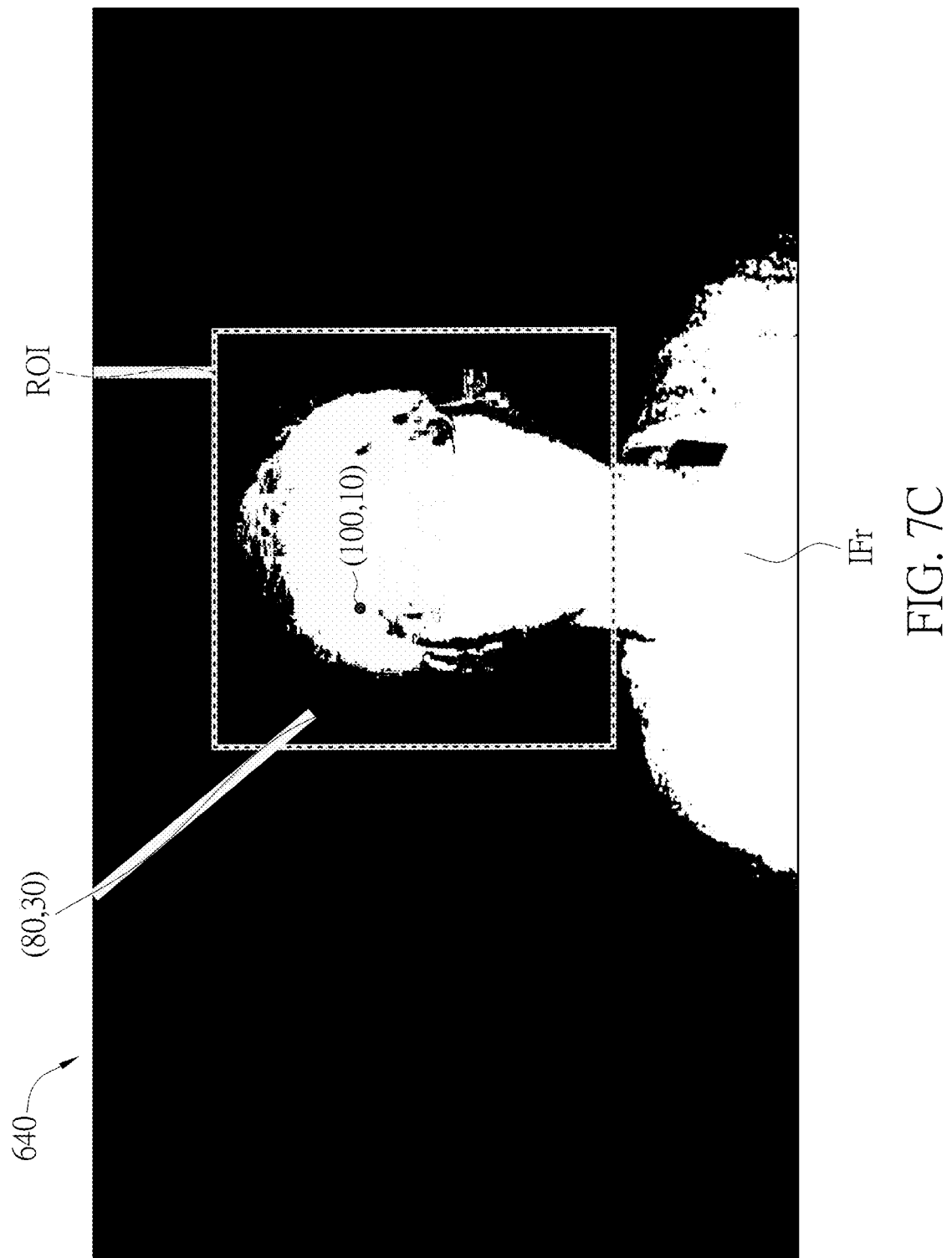
FIG. 7C is a schematic view of the binary image in one embodiment of the present disclosure.

Reference is made to FIGS. 7B-7C, which are views illustrating the differential image and the binary image respectively in one embodiment of the present disclosure. For example, the pixel position (x, y)=(100, 10), the pixel value of the foreground pixel F max=255, the maximum brightness mean value Y max=255, the farthest distance R_roi=100, and the predetermined converting value ROI_TH=250. At the pixel position(100, 10), the image processor 130 calculates the pixel value IRdiff(100, 10)=30, the brightness mean value of the color image Y(100, 10)=10, the distance R_cur(100, 10)=35 between the pixel position (100, 10) of the region of interest ROI and the central point Ct, and the color information U(100, 10)=15 and V(100, 10)=30 of the color image.

Accordingly, POW=256−IRdiff(100, 10)=256−30=236. LUM=256*Y(100, 10)/Y max=256*10/255=10. RAD=R_cur(100, 10)/R_roi=35/100=0.35, UV=|U(100, 10)−128|+|V(100, 10)−128|+|=|15−128|+|30−128|+1=212.

The image processor 130 will input the aforementioned values in the equation (2) to calculate the converting value TRS shown below.

$$TRS = \frac{256 \times 256 \times \sqrt{226}}{10 \times 0.35 \times 212} = 1328 \geq 250$$

The image processor 130 determines that the converting value TRS is greater than the predetermined converting value, which represents that the pixel position (100, 10) is the hair portion of the user FC. At the same time, the image processor 130 maps the pixel position (100, 10) to the pixel value F max=255 of the foreground pixel, and the image processor 130 converts the pixel value 0 at the pixel position (100, 10) of the differential image 530 in FIG. 7B to be the pixel value 255 at the pixel position (100, 10) of the binary image 640 in FIG. 7C.

In the following example, the pixel position (x, y)=(80, 30), the pixel value F max=255 of the foreground pixel, the maximum brightness mean value Ymax=255, the farthest distance R_roi=100, and the predetermined converting value ROI_TH=250 are in the embodiment. At the pixel position (80, 30), the image processor 130 calculates the pixel value of the differential image 530 to be IRdif(80, 30)=2, the brightness mean value of the color image Y(80, 30)=100, the distance between the pixel position (80, 30) of the region of interest ROI and the central point Ct is R_cur(80, 30)=50, and the color information of the color image is U(80, 30)=3 and V(80, 30)=4.

Accordingly, POW=256−IRdif(80, 30)=256−2=254, LUM=256*Y(80, 30)/Y max=256*100/255=100, RAD=R_cur(80, 30)/R_roi=50/100=0.5, UV=|U(80, 30)−128|+|V(80, 30)−128|+=|3−128|+|4−128|+1=250. The image processor 130 will input the aforementioned values at the equation (2) to calculate the converting value TRS shown at the following.

$$TRS = \frac{256 \times 256 \times \sqrt{254}}{100 \times 0.5 \times 250} = 83.56 < 250$$

The image processor 130 determines that the converting value TRS is less than the predetermined converting value, which represents that the pixel position (80, 30) is not the hair portion of the user FC. At the same time, the image processor 130 maintains the pixel value at the pixel position (80, 30) to be Fbi(x, y)=0. The image processor 130 maintains the pixel value at the position (80, 30) of the differential image 530 in FIG. 7B to be 0.

The pixel values at the rest of the pixel positions for the binary image 640 can be calculated according to the equations (2)-(6). Therefore, the image processor 130 calculates the binary image 640 according the aforementioned equations (2)-(6) and acquires the foreground pixels (the white color portion) to be the foreground image in the binary image 640 (step S350). According to the aforementioned description, the hair portion of the user FC is converted from the background pixel (as the pixel value of the binary image 540 in FIG. 6C is 0) to be the foreground pixel (as the pixel value of the binary strength image 640 in FIG. 7C is 255) so as to generate the foreground pixels for the human face portion, the body portion and the hair portion of the user and extract better foreground pixels. At the same time, the pixel position of the foreground image IFr corresponds to the pixel position for the user in the binary image 640 and the pixel position for the user in the color image.

Referring further to FIG. 3, after acquiring the foreground image IFr (step S530), the image processor 130 performs a background virtualization for the color image according to the foreground image to generate a background virtualized image, as described in detail in steps S360-S380.

For ease of illustration, the foreground image IFr in the binary image 640 in FIG. 7C is taken as the example. Therefore, after acquiring the foreground image IFr (step S350), the image processor 130 acquires an IR brightness mean value (step S360). Furthermore, the image processor 130 acquires the pixel values at each of the pixel positions of the foreground image IFr in FIG. 7C and averages the pixel values to generate the IR brightness mean value. Since the pixel values for the hair portion are very low, the result of the IR brightness mean value is easily affected. Therefore, at a different embodiment, the image processor 130 maps the pixel positions for each of the foreground pixels in the binary image 540 to the differential image 530 (eliminating the foreground pixel for the hair portion). The image processor 130 acquires the pixel values corresponding to the pixel positions in the differential image 530 and averages the pixel values to generate the IR brightness mean value.

In order to form a virtual scene that approaches reality, the image processor 130 calculates a blurred radius according to the IR brightness mean value and performs the background virtualization at different degrees according to the distance between the foreground image IFr and the electronic apparatus (step S370). During the period of calculating the blurred radius, when the IR brightness mean value is greater, the blurred radius is greater (the IR brightness mean value is positively correlated to the blurred radius). When the foreground image IFr is closer to the electronic apparatus, the IR brightness mean value indicates a higher brightness. Conversely, when the foreground image IFr is further away from the electronic apparatus, the IR brightness mean value indicates a higher darkness.

Accordingly, the image processor 130 arranges the step S360-S370 into the following equation (7) so as to calculate the blurred radius according to the IR brightness mean value.

$$Ract = R\max \times \frac{\text{IRdif\_mean}}{\text{IRdif\_max}} \qquad (7)$$

where R max is the maximum blurred radius, IRdif_max is the maximum IR brightness mean value, IRdif_mean is the IR brightness mean value, and the Ract is the blurred radius. It should be noted that the definition of the blurred radius may be different and equation (7) is just one of the definitions. For example, the maximum blurred radius R max=15, the maximum IR brightness mean value IRdif_max=200, and the IR brightness mean value IRdif_mean=55. Therefore, the image processor 130 calculates the blurred radius Ract=15*(55/200)=4 according to the equation (7).

After acquiring the blurred radius (step S370), the image processor 130 filters the color image (e.g., a secondary mean value filtering) according to the blurred radius to generate a background virtualized image (step S380). For example, if the blurred radius Ract=3, it represents that the size of the mask is 3*3. Therefore, the image processor 130 filters the color image (e.g., the secondary mean value filtering) according to the 3*3 mask (the blue radius Ract=3) to generate a background virtualized image (not shown in figure). For example, if the blurred radius Ract=4, it represents that the mask is 4*4. In practice, the 4*4 mask is the combination of the 3*3 mask and the 5*5 mask. Therefore, the image processor 130 filters the color image (e.g., the secondary mean value filtering) according to the 3*3 mask and the 5*5 mask respectively to generate a first virtualized image and a second virtualized image (not shown in figures). Finally, the image processor 130 sequentially averages the pixel values at a certain pixel position with the first virtualized image and the second virtualized image to generate the background virtualized image (not shown in figure).

In different embodiments, the image processor 130 may also generate the blurred radius according to different sizes of the masks, and the present disclosure is not limited thereto. The embodiment for the image processor performing the secondary mean value filtering in one image is well known for a person with ordinary skill in the art, and detail descriptions thereof will be omitted herein.

In other methods to acquire the virtual scene that approaches reality, the image processor 130 may further perform a mean value filtering in the binary image to generate a progressive image after acquiring the binary image. Taking the binary image 640 in FIG. 7C as the example, and with reference to FIG. 7C an FIG. 8, the image processor 130 performs the mean value filtering in the binary image 640 to generate the progressive image 740. The progressive image 740 includes a plurality of progressive pixels, and the progressive pixels are made of a plurality of the foreground adjusting pixels P1, a plurality of the gray pixels P2 and a plurality of background adjusting pixels P3. In the present embodiment, the pixel value of the foreground pixel P1 is 255 indicating the white color in the progressive image 740. The pixel value of the background adjusting pixel P3 is 0 indicating the black color in the progressive image 740. The pixel value of the gray pixel P2 is between 1 and 254 indicating the gray color in the progressive image 740. Furthermore, the image processor 130 may design different masks, e.g., a 3*3 mask, according to different situations and implement the mask to perform the mean value filtering in the binary strength image 640 to generate the progressive image 740, and the present disclosure is not limited thereto.

Figure 8:
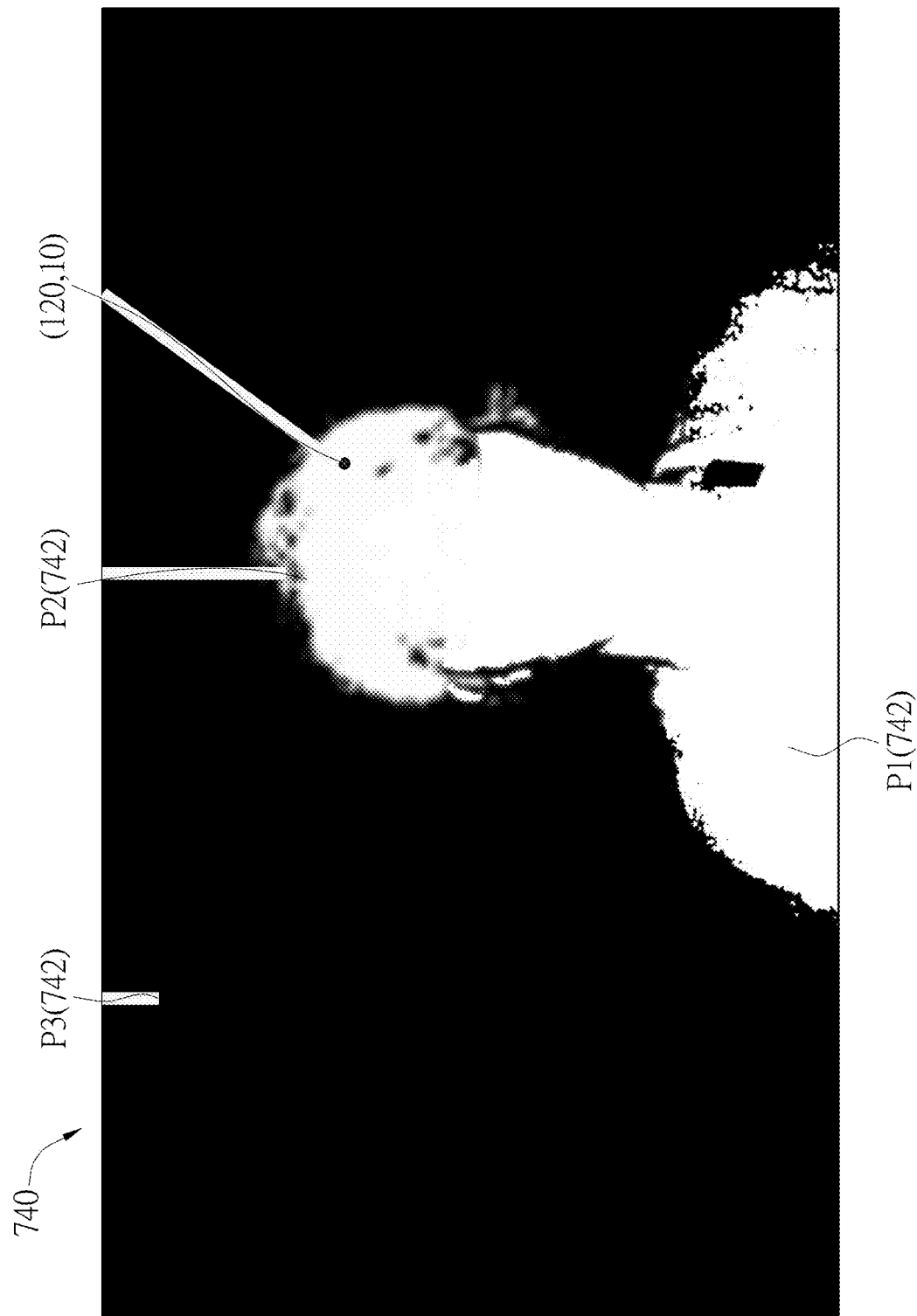
FIG. 8 is a schematic view of a progressive image in one embodiment of the present disclosure.

Compared to the implementation of a single blurred radius by the image processor 130 to perform the filtering in the color image in the aforementioned embodiment, the image processor 130 in the present embodiment may determine different blurred radiuses according to different pixel values for each of the gray pixels in the progressive image 740 and implement the blurred radiuses to perform a filtering in the portion of the gray pixels in the progressive image corresponding to the color image so as to form a virtual scene that approaches reality. Therefore, as shown in FIG. 8, the image processor 130 adjusts the blurred radius according to each of the gray pixels P2 and a maximum pixel value to generate a progressive blurred radius at the pixel position for each of the gray pixels P2.

Therefore, the image processor 130 may arrange the aforementioned method of calculating the progressive blurred radius into the following equation (8) so as to generate the progressive blurred radius at the pixel position for each of the gray pixels P2.

$$Rgray(a, b) = Ract \times \frac{P\max - P2(a, b)}{P\max} \quad (8)$$

where (a, b) is the pixel position of a certain gray pixel P2 in the progressive image 740, Ract is the blurred radius calculated by equation (7), P max is the maximum pixel value, P2(a, b) is the pixel value of the certain gray pixel P2, and Rgray(a, b) is the progressive blurred radius of the certain gray pixel. It should be noted that the definition of the progressive blurred radius Rgray(a, b) may be different, and equation (8) is just one of the definitions in the present embodiments. For example, the blurred radius Ract=4, the pixel position of the gray pixel P2(a, b)=(120, 10), the pixel value of the gray pixel P2(a, b)=130, and the maximum pixel value P max=255. Therefore, the image processor 130 calculates the progressive blurred radius with Rgray(120, 10)=4*130/255=2, which is different from the blurred radius Ract.

With reference to FIG. 8, after the image processor 130 calculates the single blurred radius Ract corresponding to the foreground adjusting pixel P1 and the background adjusting pixel P3, and calculates the progressive blurred radius Rgray(a, b) corresponding to each of the gray pixels P2, the image processor 130 performs a filtering (e.g., the secondary mean value filtering) of the color image. Furthermore, in the color image, the image processor 130 implements the pixel values corresponding to the pixel positions of the foreground adjusting pixels P1 and the background adjusting pixels P3 to be a plurality of first color values, and implements the pixel values corresponding to the pixel positions of the gray pixels P2 to be a plurality of second color values. Then, the image processor 130 performs the filtering to the first color values sequentially according to the blurred radius Ract and the second color values according to the progressive blurred radius Rgray(a, b) so as to generate the background virtualized image.

In the generation of the aforementioned virtualized image, although the blurred radius Ract is implemented in the pixel values of the color image corresponding to the pixel positions of the foreground adjusting pixel P1, the pixels corresponding to the foreground adjusting pixels P1 in the blended image 900 are not virtualized according to the weight adjustment in the next step (e.g., equation (9) and the related description in the following chapter).

According to the aforementioned description, the image processor 130 may perform the background virtualization in different degrees according to the distance between the foreground image and the electronic apparatus so as to form a virtual scene that approaches reality.

In order for the foreground image to be clearly shown from the final image, the image processor 130 may blend the pixel values corresponding to the color image with the pixel values corresponding to the background virtualized image according to the pixel values of the progressive pixels 742 in the progressive image 740 in FIG. 8 to generate a blended pixel value in the pixel position of the blended image 900. Furthermore, during the process to generate the blended pixel value in the pixel position of the blended image 900, the image processor 130 calculates a first weight ratio and a second weight ratio according to the pixel value of the progressive pixel 740, and the sum of the first weight ratio and the second weight ratio is 1. Then, the image processor 130 blends the color image and the background image according to the first weight ratio and the second weight ratio to generate the blended pixel value at the certain pixel position.

Accordingly, the image processor 130 may arrange the aforementioned blended method into the following equation (9) to calculate the blended pixel value in the corresponding pixel position. The blended pixel value is:

$$Pmix(m, n) = Irgb(m, n) \times \frac{Pgr(m, n)}{P\max} + Iblur(m, n) \times \left(1 - \frac{Pgr(m, n)}{P\max}\right) \quad (9)$$

where (m, n) is the certain pixel position, Irgb(m, n) is the pixel value at the certain pixel position in the progressive image 740 (the first weight ratio is Pgr(m, n)/P max and the second weight ratio is (1−(Pgr(m, n)/P max)), Iblur(m, n) is the pixel value at the certain pixel position in the background virtualized image, P max is the maximum pixel value (e.g., 255), and the Pmix(m, n) is the blended pixel value at the certain pixel position. It should be noted that the definition of the blended pixel value Pmix(m, n) may be different, and equation (9) is just one of the definitions in the present embodiment.

According to the equation (9), for the foreground adjusting pixel P1, since Pgr(m, n)=255, the weight ratio (the first weight ratio) of the color image Irgb(m, n) is 1, and the weight ratio (the second weight ratio) of the background virtualized image Iblur(m, n) is 0. For the background adjusting pixel P3, since Pgr(m, n)=0, the weight ratio (the first weight ratio) of the color image Irgb(m, n) is 0, and the weight ratio (the second weight ratio) of the background virtualized image Iblur(m, n) is 1. Accordingly, the background of the blended image 900 is virtualized to show the foreground image clearly.

Figure 9:
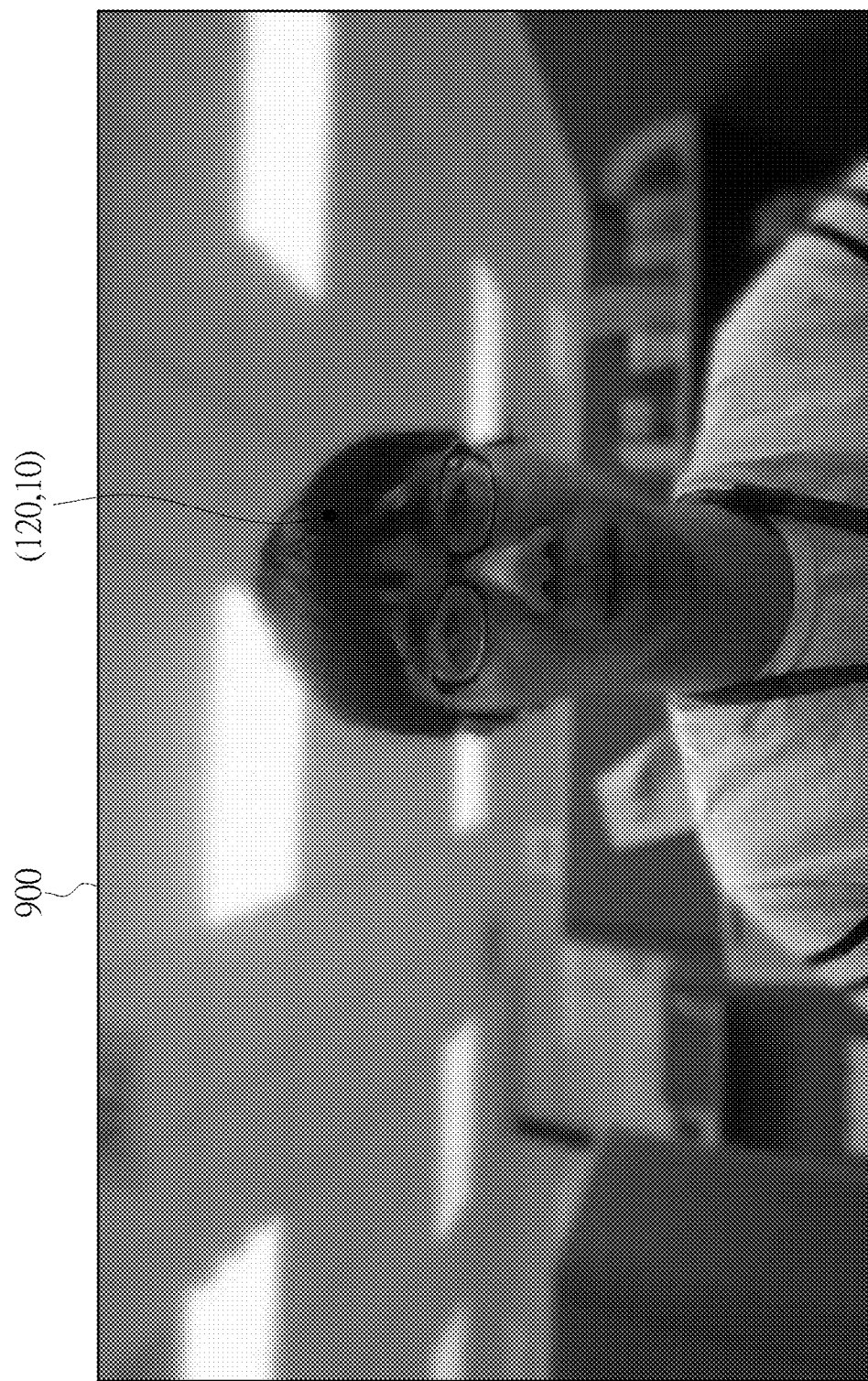
FIG. 9 is a schematic view of a blended image in one embodiment of the present disclosure.

With reference to FIG. 9, for example, the pixel position (m, n)=(120, 10), the pixel value at the pixel position in the color image Irgb(120, 10)=40, the pixel value at the pixel position (120, 10) in the progressive image 740 Pgr(m, n)=180, the pixel value at the pixel position (120, 10) in the background virtualized image Iblur(120, 10)=50, and the maximum pixel value P max=255. Therefore, the image processor 130 calculates the blended pixel value according to the equation (9) with Pmix(120, 10)=40*(180/255)+50*(1−(180/255))=43.

Accordingly, the image processor 130 may blend the color image with the background virtualized image to generate the blended pixel values for each of the pixel positions in the blended image 900 so as to smoothen the image in the blended image 900 corresponding to the gray pixel P2 of the progressive image 740 to form a virtual scene that approaches reality.

In conclusion, a background blurred method based on a foreground image and an electronic device are provided in the embodiment of the present disclosure. The methods and the electronic device are capable of blurring the background of a color image according to the foreground image (including the human face portion, the body portion and the hair portion of the user) so as to generate a background blurred image. Furthermore, the electronic device performs the background blurring by different degrees to the color image according to the distance between the foreground image and the electronic device such that the background blurred image can be closer to the reality.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A background blurred method based on a foreground image, adapted for an electronic device, the background blurred method comprising the steps of:
    acquiring a color image, an infrared (IR) light frame image indicating a light state and an IR dark frame image indicating a dark state, calculating a differential image between the IR light frame image and the IR dark frame image, thresholding the differential image to generate a binary image;
    acquiring a foreground image of the binary image, wherein the binary image has a pixel position corresponding to that of the color image, wherein the pixel position of the foreground image corresponds to a pixel position of an object in the binary image and corresponds to a pixel position of the object in the color image;
    acquiring an IR brightness mean value of a foreground part of the differential image, wherein the foreground part corresponds to the foreground image; and
    filtering the color image to generate a background blurred image according to the IR brightness mean value, wherein a blurred degree of at least a part of the background blurred image is positively correlated with the IR brightness mean value.

2. The background blurred method based on the foreground image according to claim 1, wherein the step of acquiring the IR brightness mean value of the foreground part of the differential image further includes:
    acquiring, in the differential image, a pixel value in each of the pixel positions corresponding to the foreground image; and
    averaging the pixel values to acquire the IR brightness mean value.

3. The background blurred method based on the foreground image according to claim 1, wherein the step of acquiring the color image, the IR light frame image and the IR dark frame image further includes:
    capturing a plurality of frame images of the object during a period from the dark state to the light state and back to the dark state through an IR emitter; and
    capturing, from the plurality of frame images, the IR light frame image indicating the light state, the IR dark frame image indicating the dark state and the color image.

4. The background blurred method based on the foreground image according to claim 1, wherein after the step of acquiring the binary image, the background blurred method further includes:
    performing a mean value filtering on the binary image to generate a progressive image, wherein the progressive image includes a plurality of progressive pixels that are composed of a plurality of foreground adjusting pixels, a plurality of grayscale pixels and a plurality of background adjusting pixels.

5. The background blurred method based on the foreground image according to claim 4, wherein the step of generating the background blurred image further includes:
    calculating a blurred radius according to the IR brightness mean value, wherein the blurred radius is positively correlated with the IR brightness mean value;
    generating a progressive blurred radius at the pixel position of each of the grayscale pixels according to the blurred radius and the pixel value of each of the grayscale pixels in the progressive image; and filtering the color image according to the blurred radius and the progressive blurred radiuses.

6. The background blurred method based on the foreground image according to claim 5, wherein the step of filtering the color image further includes:

taking the pixel values corresponding to the pixel positions of the foreground adjusting pixels and the background adjusting pixels as a plurality of first color values, and taking the pixel values corresponding to the pixel positions of the grayscale pixels as a plurality of second color values; and sequentially filtering the first color values according to the blurred radius, and sequentially filtering the second color values according to the progressive blurred radiuses.

7. The background blurred method based on the foreground image according to claim 4, wherein after the step of generating the background blurred image, the background blurred method further includes:

sequentially blending, in the same pixel position, the corresponding pixel values in the color image and the corresponding pixel values in the background blurred image according to the pixel values of the corresponding progressive pixels, to generate a blended pixel value at the pixel position of a blended image.

8. The background blurred method based on the foreground image according to claim 7, wherein the step of generating the blended pixel value at the pixel position of the blended image further includes:

calculating a first weight ratio and a second weight ratio according to the pixel value of the progressive pixel, and a sum of the first weight ratio and the second weight ratio is equal to 1; and blending the color image and the background blurred image according to the first weight ratio and the second weight ratio to generate the blended pixel value at the pixel position.

9. The background blurred method based on the foreground image according to claim 1, wherein the step of thresholding the differential image further includes:

determining whether the pixel value of each of the pixel positions in the differential image is greater than or equal to a threshold value;

taking the pixel position as a foreground pixel of the binary image if the pixel value of each of the pixel positions in the differential image is greater than or equal to the threshold value; and taking the pixel position as a background pixel of the binary image if the pixel value of each of the pixel positions in the differential image is less than the threshold value.

10. An electronic device, comprising:

an IR emitter, configured to transmit an IR signal;

an image capturing device, configured to receive an IR reflection signal related to the IR signal, and configured to receive a visible light signal; and an image processor, coupled to the IR emitter and the image capturing device and configured to execute steps of:

acquiring a color image, an infrared (IR) light frame image indicating a light state and an IR dark frame image indicating a dark state;

calculating a differential image between the IR light frame image and the IR dark frame image, and thresholding the differential image to generate a binary image;

acquiring a foreground image of the binary image, wherein the binary image has a pixel position corresponding to that of the color image, wherein the pixel position of the foreground image corresponds to a pixel position of an object in the binary image and corresponds to a pixel position of the object in the color image;

acquiring an IR brightness mean value of a foreground part of the differential image, wherein the foreground part corresponds to the foreground image; and filtering the color image to generate a background blurred image according to the IR brightness mean value, wherein a blurred degree of at least a part of the background blurred image is positively correlated with the IR brightness mean value.

11. The electronic device according to claim 10, wherein in the step of acquiring the IR brightness mean value of the foreground part of the differential image by the image processor, the image processor is further configured to:

acquire, in the differential image, a pixel value in each of the pixel positions corresponding to the foreground image; and average the pixel values to acquire the IR brightness mean value.

12. The electronic device according to claim 10, wherein in the step of acquiring the color image, the IR light frame image and the IR dark frame image by the image processor, the image processor is further configured to:

capture a plurality of frame images of the object during a period from the dark state to the light state and back to the dark state through an IR emitter; and capture, from the plurality of frame images, the IR light frame image indicating the light state, the IR dark frame image indicating the dark state and the color image.

13. The electronic device according to claim 10, wherein after the step of acquiring the binary image by the image processor, the image processor is further configured to:

perform a mean value filtering on the binary image to generate a progressive image, wherein the progressive image includes a plurality of progressive pixels made of a plurality of foreground adjusting pixels, a plurality of grayscale pixels and a plurality of background adjusting pixels.

14. The electronic device according to claim 13, wherein in the step of generating the background blurred image by the image processor, the image processor is further configured to:

calculate a blurred radius according to the IR brightness mean value;

generate a progressive blurred radius at the pixel position of each of the grayscale pixels according to the blurred radius and the pixel value of each of the grayscale pixels in the progressive image; and filter the color image according to the blurred radius and the progressive blurred radiuses, wherein the blurred radius is in positive correlation with the IR brightness mean value.

15. The electronic device according to claim 14, wherein in the step of filtering the color image by the image processor, the image processor is further configured to:

take pixel values corresponding to the pixel positions of the foreground adjusting pixels and the background adjusting pixels as a plurality of first color values, and take pixel values corresponding to the pixel positions of the grayscale pixels as a plurality of second color values; and sequentially filter the first color values according to the blurred radius, and sequentially filter the second color values according to the progressive blurred radiuses.

16. The electronic device according to claim 13, wherein after the step of generating the background blurred image by the image processor, the image processor is further configured to: sequentially blend, in the same pixel position, the corresponding pixel values in the color image and the corresponding pixel values in the background blurred image according to the pixel values of the corresponding progressive pixels, to generate a blended pixel value at the pixel position of a blended image.

17. The electronic device according to claim 16, wherein in the step of generating the blended pixel value at the pixel position of the blended image by the image processor, the image processor is further configured to:

calculate a first weight ratio and a second weight ratio according to the pixel value of the progressive pixel, and a sum of the first weight ratio and the second weight ratio is equal 1; and blend the color image and the background blurred image according to the first weight ratio and the second weight ratio to generate the blended pixel value at the pixel position.

18. The electronic device according to claim 10, wherein in the step of thresholding the differential image by the image processor, the image processor is further configured to:

determine whether the pixel value of each of the pixel positions in the differential image is greater than or equal to a threshold value;

take the pixel position as a foreground pixel of the binary image if the pixel value of each of the pixel positions in the differential image is greater than or equal to the threshold value; and take the pixel position as a background pixel of the binary image if the pixel value of each of the pixel positions in the differential image is less than the threshold value.

* * * * *